US005558533A

United States Patent [19]
Hashizawa et al.

[11] Patent Number: 5,558,533
[45] Date of Patent: Sep. 24, 1996

[54] ELECTRICAL CONNECTOR

[75] Inventors: Shigemi Hashizawa; Shigemitsu Inaba; Toshiaki Hasegawa, all of Shizuoka, Japan

[73] Assignee: Yazaki Corporation, Tokyo, Japan

[21] Appl. No.: 419,936

[22] Filed: Apr. 11, 1995

Related U.S. Application Data

[63] Continuation of Ser. No. 165,827, Dec. 14, 1993.

[30] Foreign Application Priority Data

Dec. 18, 1992 [JP] Japan .................................... 4-338738
May 12, 1993 [JP] Japan .................................... 5-110186

[51] Int. Cl.$^6$ .................................................. H01R 13/62
[52] U.S. Cl. ........................... 439/310; 439/352; 439/372
[58] Field of Search ............................... 439/32, 48, 135, 439/136, 142, 310, 352, 353, 357, 358, 372

[56] References Cited

U.S. PATENT DOCUMENTS

| 3,111,355 | 11/1963 | Samburoff et al. | 439/310 |
| 3,529,276 | 9/1970 | Hennesey, Jr. | 439/310 |
| 4,658,212 | 4/1987 | Ozawa et al. | 439/310 |
| 4,952,160 | 8/1990 | Oben | 439/142 |
| 5,350,312 | 9/1994 | Kuno et al. | 439/310 |

FOREIGN PATENT DOCUMENTS

| 50-95790 | 7/1975 | Japan . |
| 60-24539 | 6/1985 | Japan . |
| 1003616 | 9/1965 | United Kingdom . |
| 1317955 | 5/1973 | United Kingdom . |

*Primary Examiner*—Hien D. Vu
*Attorney, Agent, or Firm*—Armstrong, Westerman, Hattori, McLeland & Naughton

[57] ABSTRACT

The present invention provides an electrical connector used for charging an automobile in which an incomplete connection between a feeding connector half and a receiving connector half is prevented and the work of connecting both connector halves can be easily carried out with a small insertion force. The feeding connector according to the present invention includes a feeding connector half and a receiving connector half, wherein the feeding connector half includes: a case; a connector main body slidably accommodated in a front half portion of the case for accommodating a plurality of terminals; a handle attached to a rear half portion of the case; a slider for causing the connector main body to slide; a member for positioning the feeding connector half with respect to the receiving connector half and for preliminarily locking the feeding connector half to the receiving connector half; a lever means for routing to complete lock the feeding connector half to the receiving connector half, the lever means having an intermediate portion between a working portion and an operating portion, the working portion rotatably attached to the handle and the operating portion projecting out of the case; and a means for locking and unlocking the lever at in its rotated position to completely lock the connector main body of the feeding connector half to a connector main body of the receiving connector half.

3 Claims, 13 Drawing Sheets

ELECTRICAL CONNECTOR

This is a continuation, of application Ser. No. 08/165,827 filed Dec. 14, 1993.

FIELD OF THE INVENTION

The present invention relates generally to an electrical connector, used for charging an automobile, and more particularly to an electrical connector in which incomplete connection between a feeding connector half and a receiving connector half is prevented and the force necessary to connect the connector halves is small so that the connection of the connector halves may be easily carried out with a one-touch operation.

BACKGROUND OF THE INVENTION

Referring to FIGS. 15 and 16, a conventional electrical connector which is disclosed in Japanese Patent Application Laid-open Showa 50-95790 is shown. The electrical connector includes a female connector half 71 (a receiving connector half), which is fixed to a vehicle body or similar, and a male connector half 72 (a feeding connector half), which is attached to feeding equipment.

In FIG. 15, the connecting of the female connector half 71 to the male connector half 72 to form the electrical connector is shown. A hood 75 of the female connector half 71 is inserted into a gap between a housing main body 73 of the male connector half 72. Furthermore, a stud 76 on an inner wall of the coupling nut 74 of the male connector half 72 is forced to proceed into a spiral channel 77 of the female connector half 71 while rotating the coupling nut 74 to connect the male connector half 72 to the female connector half 71. That is, the conventional electrical connector adopts a so-called bayonet-lock method. A concave portion 77a is formed at an end of the spiral channel 77 of the female connector half 71 and the stud 76 of the male connector half 72 is engaged with the concave portion 77a to form a complete connection between the female connector half 71 and the male connector half 72.

Referring to FIG. 16, reference numeral 78 represents male terminals, reference numeral 79 represents female terminals, reference numeral 80 represents a spring, and reference numeral 81 represents a gasket. The spring 80 urges the housing main body 73 to the female connector half 71.

With the conventional bayonet-locking type electrical connector, there is the possibility that when the female and male connector halves 71 and 72 are engaged with each other the rotation of the coupling nut 74 may be stopped before complete locking of the connector halves 71 and 72. Further, it is difficult to check at a glance whether the locking is complete or not. The coupling nut 74 needs to be rotated until completely fastened. This causes the work to be worrisome and a worker's hands will ache from the work. Further, in a multi-pole connector with an increased number of terminals accommodated in the female and male connector halves 71 and 72, a considerably large force is required to connect the connector halves 71 and 72 to each other. Thus, it is difficult for a conventional bayonet-locking type connector to carry out the locking operation with a reduced insertion force as is desirable.

The present invention has been accomplished to eliminate the drawbacks of the conventional bayonet-locking type electrical connector described above. The object of the present invention is to provide an electrical connector for charging an automobile which requires a reduced insertion force in order to connect the fee:ling connector half to the receiving connector half and in which: the incomplete locking of the connector halves is securely prevented; the operational efficiency of the locking is improved; and the connection and disconnection between the connector halves is carried out with an one-touch operation.

SUMMARY OF THE INVENTION

The present invention has been accomplished to eliminate the drawbacks described above, and the object thereof is to provide an electrical connector in which the work of connecting the connector halves is carried out with ease, the interior of the connector halves is simplified to provide a multi-pole connector, and the disconnection of the connector halves during the charging is securely prevented.

Another object of the present invention is to provide an electrical connector in which a lever, which is used for engaging a main body of a feeding connector half with a mated main body of a receiving connector half, can be rotated only when the feeding connector half is preliminarily locked to the receiving connector half. This prevents the lever from accidentally rotating.

An electrical connector according to the present invention includes a feeding connector half and a receiving connector half, wherein the feeding connector haft includes: a case; a connector main body slidably accommodated in a front half portion of the case for accommodating a plurality of terminals; a handle attached to a rear half portion of the case; a slider for causing the connector main body to slide; a member for positioning the feeding connector half with respect to the receiving connector half and for preliminarily locking the feeding connector half to the receiving connector half; a first lever means for rotating to complete lock the feeding connector half to the receiving connector half, the first lever means having an intermediate portion between a working portion and an operating portion, the working portion rotatably attached to the handle and the operating portion projecting out of the case; and a means for locking and unlocking the lever at in its rotated position to completely lock the connector main body of the feeding connector half to a connector main body of the receiving connector half.

The means for positioning and preliminarily locking the feeding connector half to the receiving connector half may be a guide channel and rolling pin arrangement or a locking arm, locking claw and locking channel arrangement.

The means for locking an unlocking the lever may be a locking bar and cam arrangement or a second lever means.

BRIEF DESCRIPTION OF THE DRAWING FIGURES

The present invention will be more apparent from the following description taken with reference to the accompanying drawing figures wherein.

DETAILED DESCRIPTION OF THE PREFERRED EMBODIMENTS

Referring to FIGS. 1–9, an electrical connector according to a first embodiment of the present invention includes a feeding connector half A attached to feeding equipment, not shown, and a receiving connector half B fixed to a vehicle body or similar, is illustrated.

Figure 3:
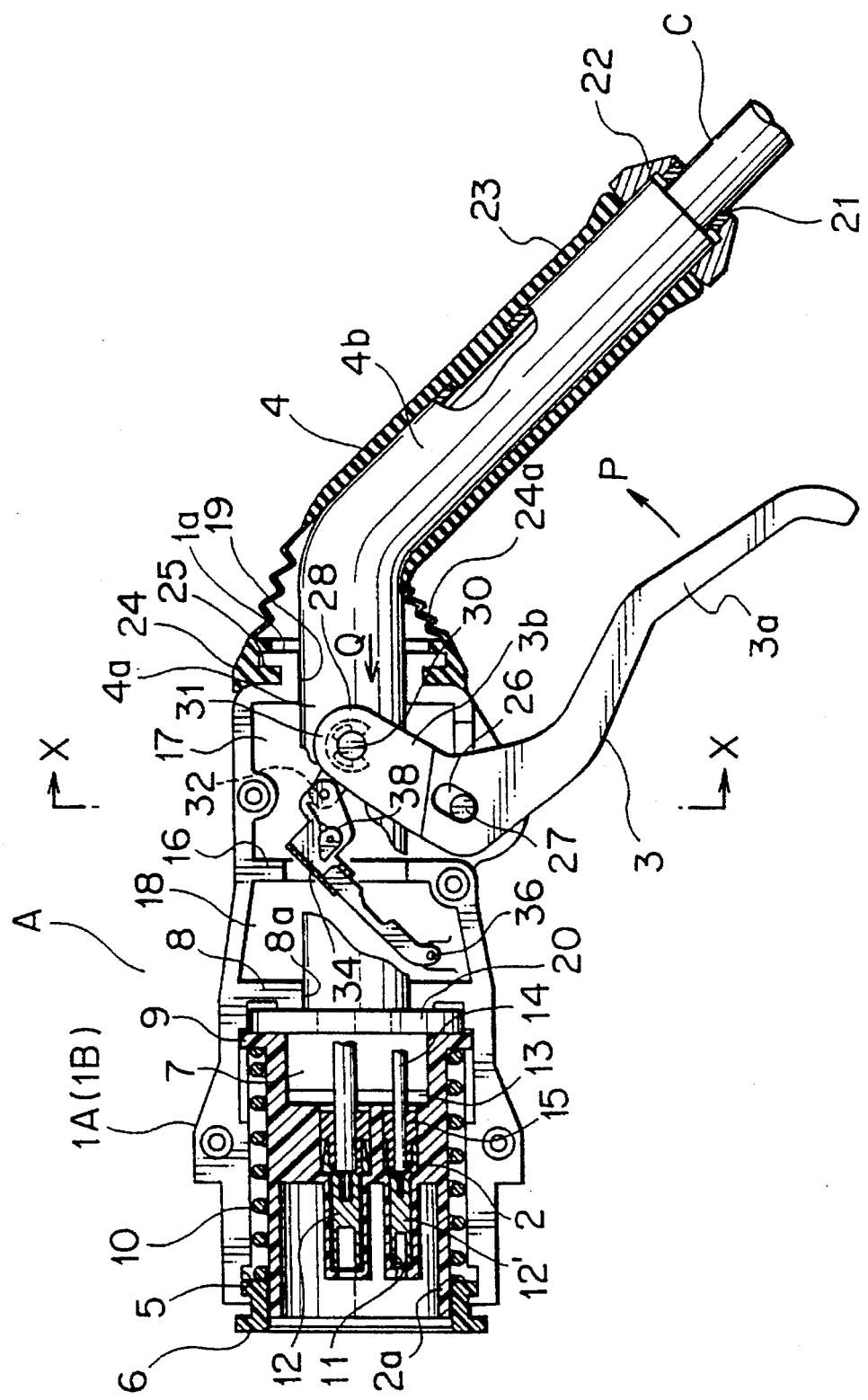
FIG. 3 is a cross-sectional view through the length of the electrical connector in FIG. 1.

In the electrical connector according to the present invention, FIG. 3 show a reference numeral 1 which represents a case consisting of a pair of slit cases 1A and 1B opposing each other and approximately symmetrical to each other. A connector main body 2 is slidably mounted in a front half of the case 1, and a handle 4 is movably attached to a rear half of the case 1 for sliding the connector main body 2 in the case by rotating a lever 3. A cable C extending from the feeding equipment, not shown, is introduced into a rear end of the handle 4.

The case 1 is provided with a ring channel 5 on an inner front wall thereof, and a collar 6 is engaged with the ring channel 5. A partition wall 8 is disposed in the case 1 in the middle thereof to provide the connector main body accommodating portion 7. The connector main body 2, with a flange 9 at a rear end thereof, is slidably mounted between the partition wall 8 and the collar 6, and a compression coil spring 10 is disposed between the collar 6 and the flange 9 to urge the connector main body 2 toward the handle 4.

The connector main body 2 is provided with a plurality of terminal accommodating cavities 11 therein. Female terminals 12 and 12' are accommodated in and fixed to the terminal accommodating cavities 11 and a rear holder 13 prevents the female terminals 12 and 12' from slipping out of the terminal accommodating cavities 11. Lead wires 14 are connected to a rear half portion of the female terminals 12 and 12' by a known means such as a solderless connection, and waterproof rubber plugs 15 are attached to the lead wires 14 to seal each of the terminals to prevent short circuiting.

A lever mounting portion 17 and an intermediate locking bar accommodating portion 18 are formed in the case 1 by means of a second partition wall 16. A front half of the handle 4 is inserted into an opening 19 at a rear end of the case 1 and penetrates the partition wall 16 to extend through a drilled hole 8a of the partition wall 8 to the inside of a connector main body accommodating portion 7. Thus, the front half of the handle 4 is connected to the connector main body 2 through a connector pressing plate 20.

The handle 4 is pipe-shaped to function as a through hole for the lead wires 14 of a cable C. The lead wires 14 are connected to the female terminals 12 and 12'. The handle 4 consists of a slider 4a at a front half thereof and a main body 4b at a rear half thereof. The slider 4a, at the front half of the handle 4, is slidably supported by the drilled hole 8a of the partition wall 8 and the opening 19. The main body 4b at the rear half of the handle 4 is dog-legged and a fastening nut 22 is attached to an end of the rear half of the handle 4 through a cable fixing packing 21. Reference numeral 23 represents a grip made of resilient material such as synthetic rubber, and a waterproof cap 24 is integrally formed with the grip 23 at an end thereof by way of bellows 24a. The cap 24 is fixed to the ring channel 25 at the rear end of the case 1.

Figure 5:
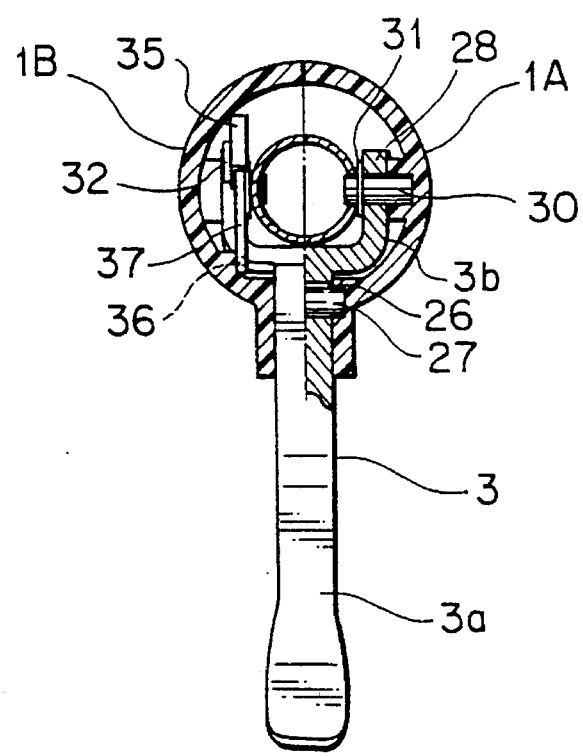
FIG. 5 is a cross-sectional view taken along the line X—X in FIG. 3.
Figure 6:
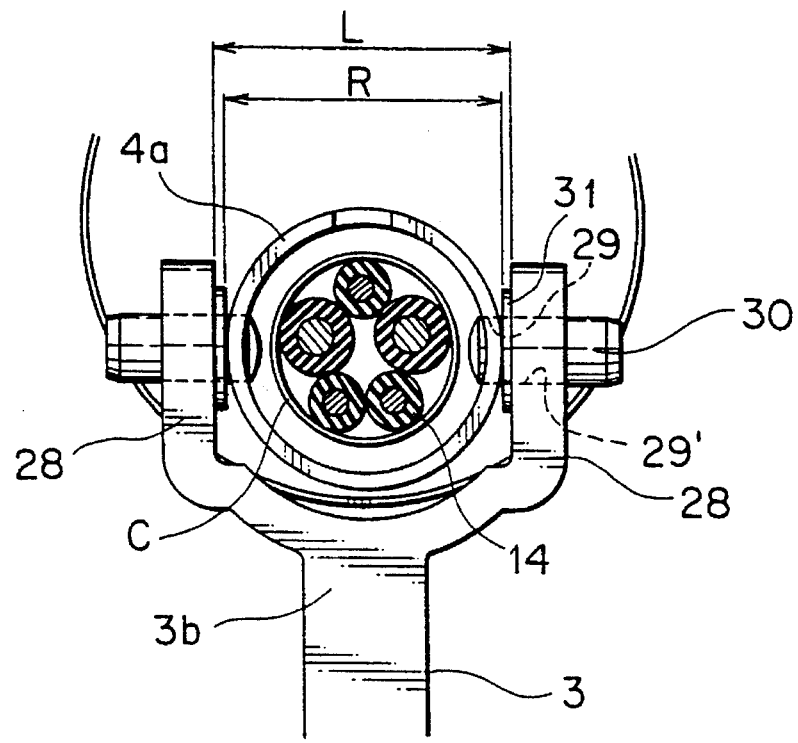
FIG. 6 is an enlarged partial cross-sectional view of the construction shown in FIG. 5.
Figure 7:
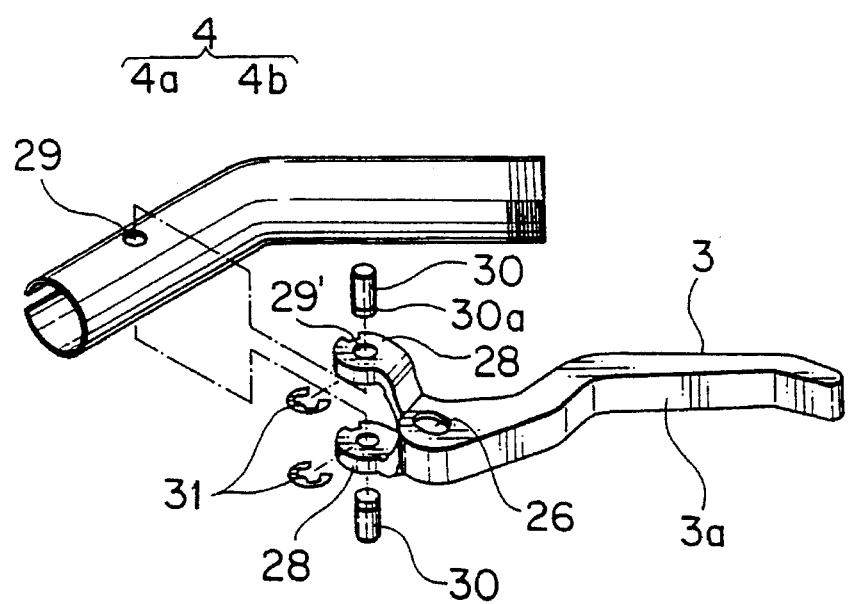
FIG. 7 is an exploded perspective view of a lever 3 and a handle 4.

FIG. 5 is a cross-sectional view illustrating the construction of the lever 3 and the handle 4 which are taken along a line X—X in FIG. 3. FIG. 6 is a partially enlarged view of the construction shown in FIG. 5. FIG. 7 is an exploded perspective view of the lever 3 and the handle 4.

As illustrated in FIGS. 5 to 7, the lever 3 is provided with two supporting pieces 28 at an end thereof forming a forked portion, and the handle 4 is rotatably supported in such a manner that the slider 4a of the pipe-shaped handle 4 is put between the supporting pieces 28 forming the forked portion.

The lever 3 is formed to be dog-legged, FIG. 3, with a long operating portion 3a and a short working portion 3b. The working portion 3b is provided with a slotted hole 26 at a crossing portion thereof and is rotatably supported at the lever mounting portion 17 in the cases 1A and 1B by a pin 27 on a lower portion thereof. Two supporting pieces 28 forming the forked portion are attached to an end of the working portion 3b of the lever 3.

Referring to FIG. 6, the interior width L, between the supporting pieces 28 forming the forked potion, is formed to be slightly larger than the outer diameter of the slider 4a of the handle 4, and shaft holes 29' of the supporting pieces 28 am mounted in accordance with a pair of shaft holes 29 of the slider 4a of the pipe-shaped handle 4. The slider 4a is placed in the forked portion formed by the supporting pieces 28 and the shaft holes 29 and 29' are aligned to insert pins 30 from opposite sides and which support lever 3. A tip of the pin 30, adjacent slider 4a, is provided with a narrow channel 30a disposed in such a manner as to be positioned at a gap between an outer periphery of the slider 4a and the supporting pieces 28. A stop ring 31 is inserted to engage with the narrow channel 30a.

The pin 30 is inserted between the lever 3 and the slider 4a through the stop ring 31 and is not axially movable to the right or to the left. An inner end of the pin 30 is engaged with the shaft hole 29 of the slider 4a and an outer end of the pin 30 passes through the shaft hole 29' of the lever 3 to fix the lever 3. Outwardly projecting portions of pins 30 are positioned between channels, not shown, in cases 1A and 1B and work as guide projections so that the slider 4a slides in parallel with the channels of the cases 1A and 1B.

Further, the slotted hole 26 of the lever 3 is attached to the cases 1A and 1B with pins 27 and permits slider 4a to move in the cases 1A and 1B in parallel with the lengthwise direction of the cases 1A and 1B. Thus, the rotational center of the lever 3 is longitudinally shifted. Hence, the slotted hole 26 provides relief in the longitudinal direction.

Referring to FIGS. 3, 3A and 3B, one of the supporting pieces 28 of the lever 3 is provided with an ear-shaped piece 32 which is rotatably attached to a locking plate 34 through a pin 33.

Figure 8A:
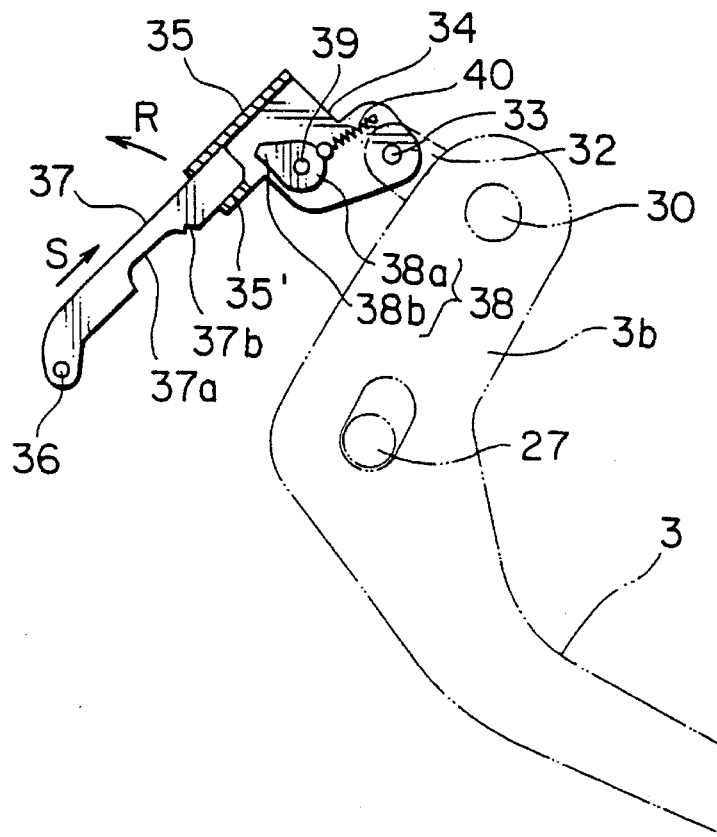
FIG. 8A and 8B are enlarge partial views of the: lever 3 of FIG. 1 and its locking and unlocking means showing a locked state and an unlocked state.

The locking plate 34 is provided with a pair of opposing guide rails 35 and 35' at an end thereof as illustrated in FIG. 8A. A locking bar 37, rotatably attached to a lower portion of a locking bar accommodating portion 18 through a pin 36 and is slidably attached to the guide rails 35 and 35'. Inner guide rail 35' is shorter than the outer guide rail 35 and a notch 37a is formed in the middle of the locking bar 37 on the same side as the inner guide rail 35' to provide relief for a cam. Further, a concave portion 37b is formed on a shoulder at an upper portion of the notch 37a.

Further, a cam 38 is supported by a pin 39 in the middle of and at a lower portion of the locking plate 34, and a tension coil spring 40 is disposed between a round portion 38a of the cam 38 and an intermediate upper portion of the locking plate 34 so that a projection 38b of the cam 38 projects toward a slide path of concave portions 37b of the locking bar 37.

Figure 4:
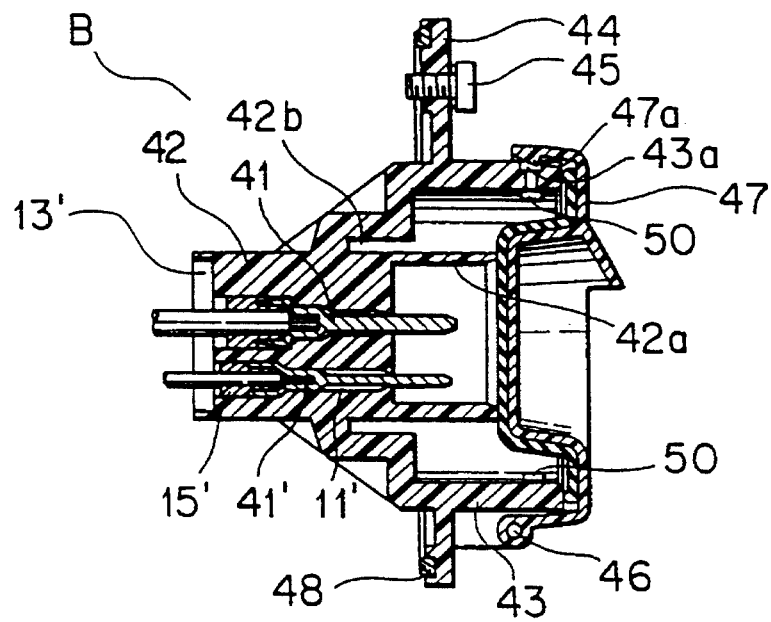
FIG. 4 is a cross-sectional view through the length of a receiving connector half B connected to the feeding connector half A in FIG. 1.

A shell 43 is formed on an outer periphery of the connector main body 42 of the receiving connector half B, in which male terminals 41 and 41' are accommodated, so as to extrude outwardly to receive a front portion of the case 1 of the feeding connector half A as illustrated in FIG. 4. The shell 43 is fixed to a vehicle body, not shown, through a flange 44 on an outer periphery of the shell 43 and bolts 45. Further, a cap 47, of which one end is attached to an opening of the shell 43 through a pin 46, is locked by means of the engagement between a locking projection 47a and a locking concave portion 43a on the outer periphery of the shell 43. Reference numeral 11' represents male terminal accommodating cavities, reference numeral 13' represents a rear holder, and reference numeral 15' represents a waterproof rubber plug, which shows almost the same construction as the feeding connector half A so that the explanation thereof will be omitted. Reference numeral 48 represents an O-ring for waterproof sealing.

Figure 2:
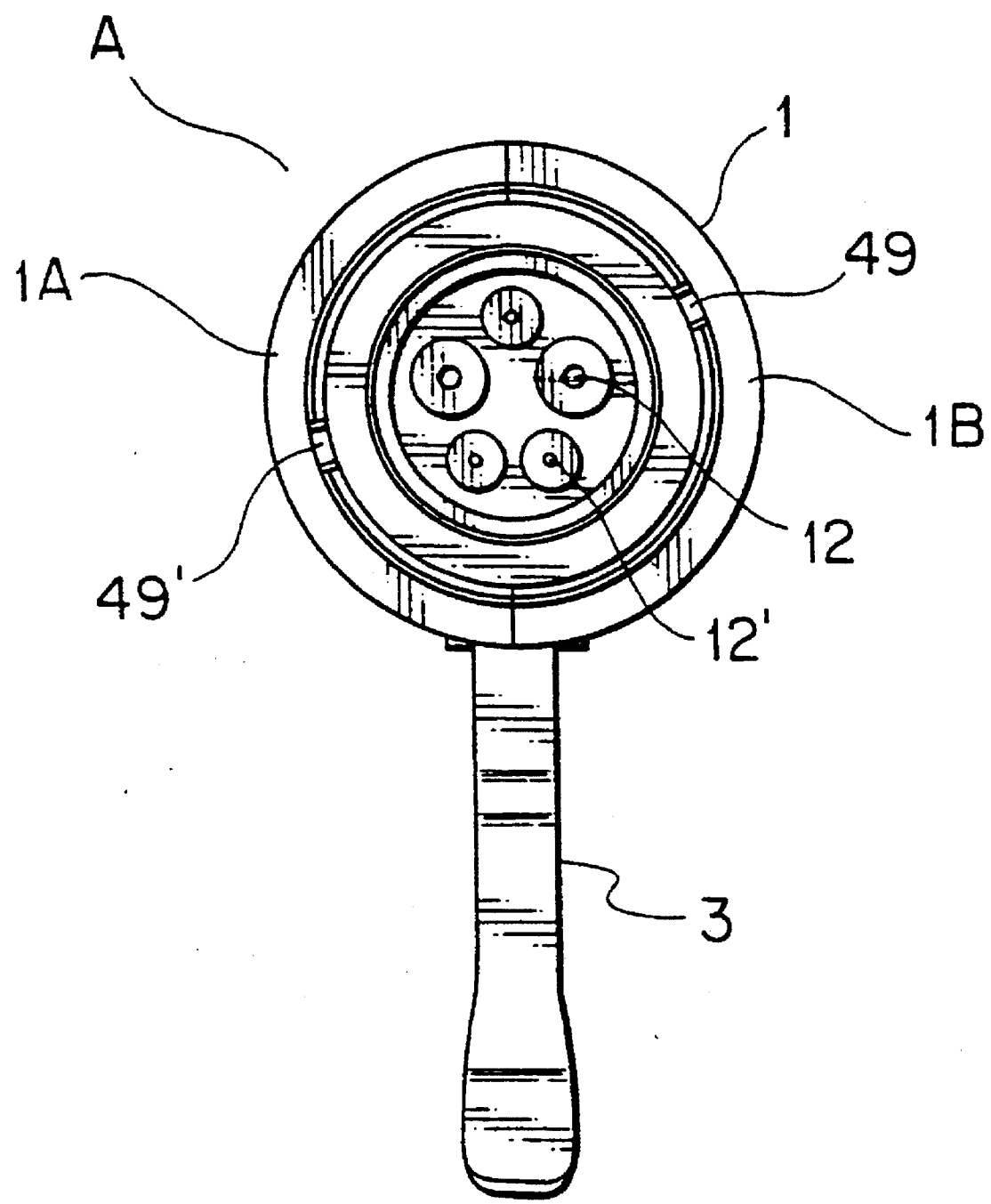
FIG. 2 is a left-side view of the electrical connector in FIG. 1.

Referring to FIG. 2, the guide channels 49 and 49' of the feeding and receiving connector halves A and B are symmetrically situated on opposite sides of a tip of the case 1 to position and preliminarily lock the feeding and receiving connector halves A and B. Rolling pins 50, FIG. 4, am rotatably mounted on an inner face of the shell 43 so as to be engaged with the guide channels 49 and 49'. The guide channels 49 and 49' consist of an introducing channel 49a extending in the same direction as the longitudinal axis of the guide channels 49 and 49' and a locking channel 49b circumferentially curves from an end of the introducing channel 49a to extend in a direction perpendicular to the longitudinal axis of the guide channels 49 and 49'. When the rolling pin 50 reaches an end of the locking channel 49b, the feeding and receiving connector halves A and B are preliminarily locked.

Figure 1:
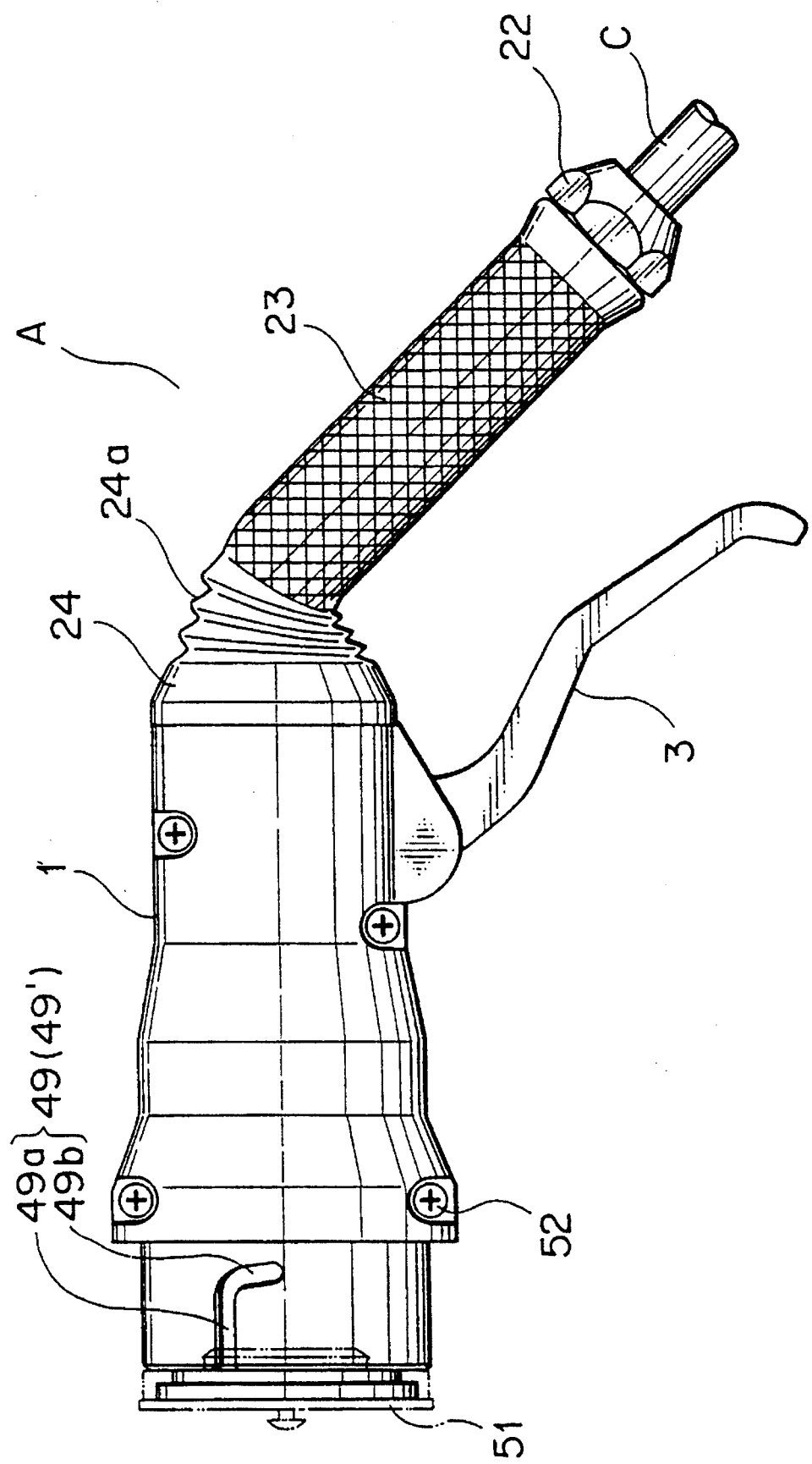
FIG. 1 is a front view of a feeding connector half A of an electrical connector according to a first embodiment of the present invention.

Referring to FIG. 4, a hood 42a of the receiving connector half B is formed on a front portion of the connector main body 42 to protect tips of the male terminals 41 and 41'. A guide wall 2a, as shown in FIG. 3, is located on a front portion of-the connector main body 2 of the feeding connector half A to receive the hood 42a. In FIG. 1, reference numeral 51 represents a cap covering the feeding connector half A and reference numeral 52 represents machine screws for connecting the split cases 1A and 1B.

In the above embodiment, the explanation was made when the female terminal 12 and the male terminal 41 are accommodated in the feeding connector half A and the receiving connector half B, respectively. However, the connector main bodies 2 and 42 may be designed such that the female terminal 12 is accommodated in the receiving connector half B and the male terminal 41 in the receiving connector half B.

In the construction described above, the case 1 of the feeding connector half A is inserted into the shell of the receiving connector half B by engaging the introducing channels 49a of the guide channels 49 with the rolling pins 50.

Then, the case 1 is rotated about the connector man body 2 at the locking channel 49b of the ease 1, and the locking pin 50 is positioned at an end of the locking channel 49b, as shown in FIG. 1, to preliminarily lock the feeding and receiving connector halves A and B. Then, the lever 3 is grasped and is rotated in the direction indicated by arrow P of FIG. 3, which causes the working portion 3b of the lever 3 to be rotated about the pin 27 so that the slider 4a of the handle 4 proceeds in the direction as indicated by an arrow Q. As a result, the connector main body 2 of the feeding connector half A is pushed forwardly in opposition to the resiliency of the compression coil spring 10 through a connector pushing plate 20 so as to be completely connected to the mating connector main body 42 of the receiving connector half B as illustrated in FIG. 6. This causes the connection between the female terminals 12 and 12' and the male terminals 41 and 41' to be completed.

Figure 8B:
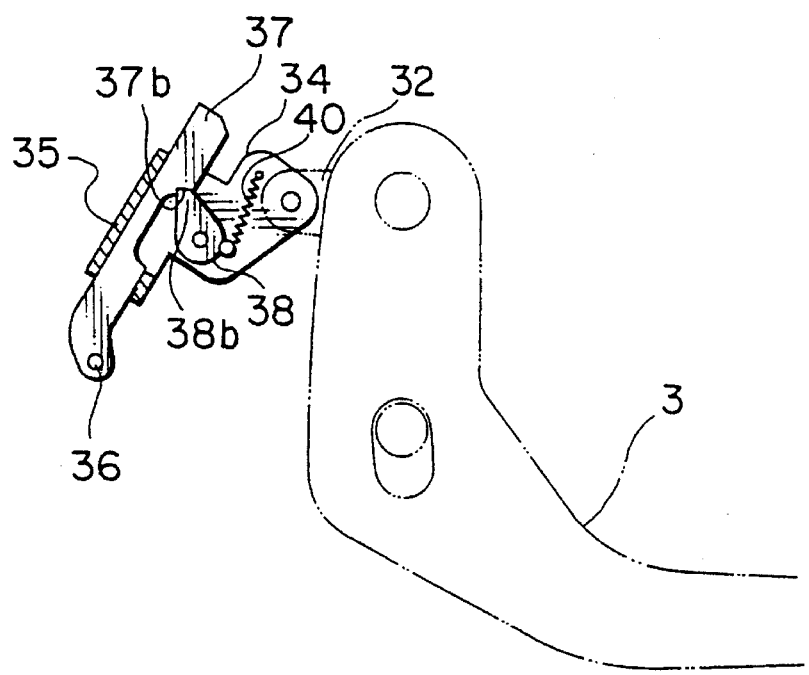
Figure 9:
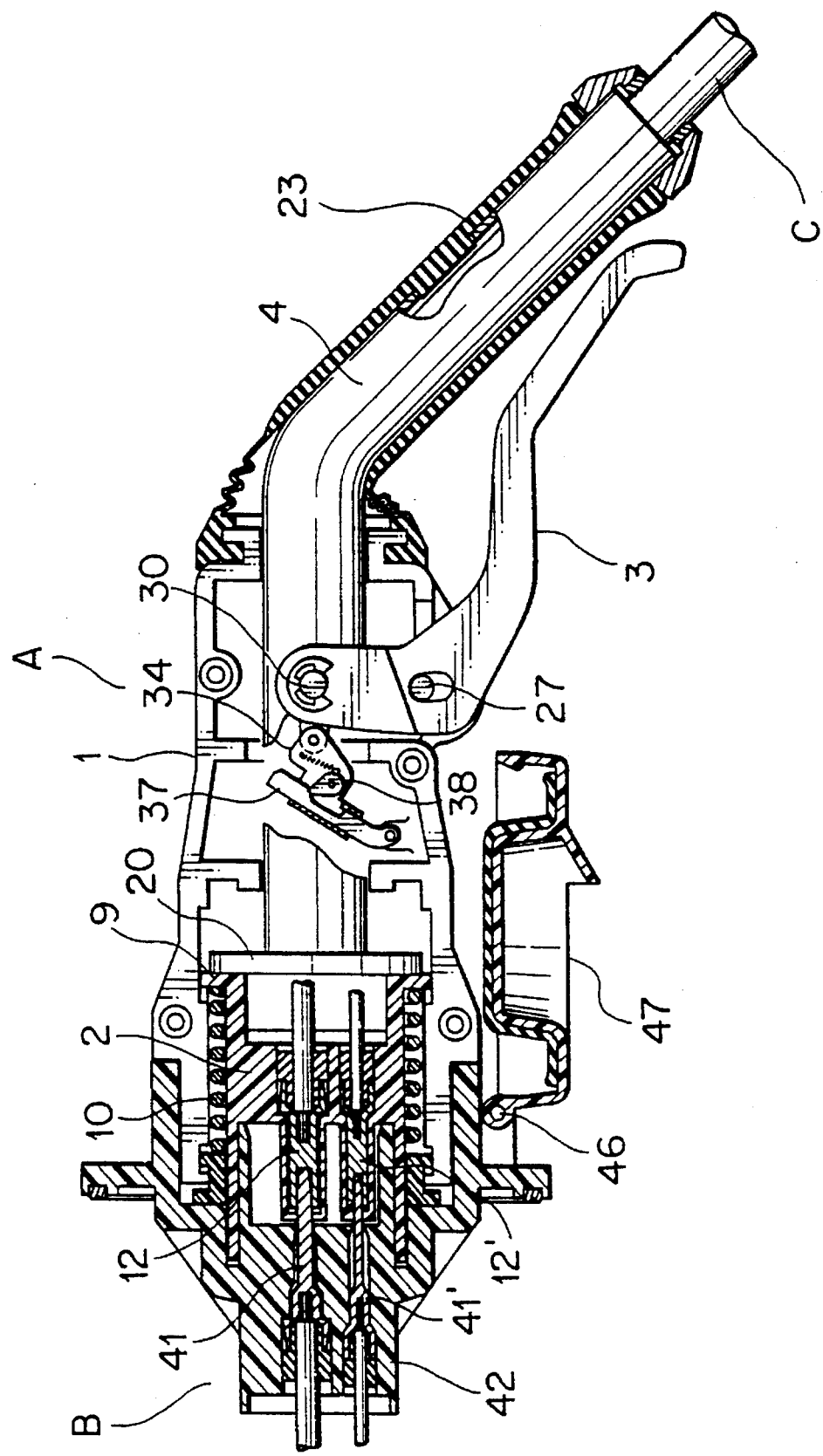
FIG. 9 is a cross-sectional view through the length of the feeding and receiving connector halves A and B in a locked state.

As shown in FIGS. 8A and 8B, the rotation of the lever 3 allows the locking plate 34 which is rotatably attached to an ear piece 32 of the working portion 3b, to move in the same direction as the lever 3 so that the locking bar 37 is guided between the guide rails 35 and 35' and is rotated about the pin 36 in the direction that the locking lever 37 rises as shown by an arrow R. As a result, a projection 38b of the cam 38 slidably contacts a side wall of the locking bar 37 and is rotated in opposition to the tension coil spring 40 to allow the projection 38b to engage with a concave portion 37b to complete the locking between the feeding and receiving connector halves A and B or between the connector main bodies 2 and 42.

In the completely locked state, the tip of the case 1 of the feeding connector half A is inserted into the shell 43 of the receiving connector half B, and the hood 42a is inserted into the guide wall 2a. A tip of the guide wall 42a is further inserted into a circular concave portion 42b between the hood 42a and the shell 43, which provides a triple waterproof sealing for the electrical connector.

The unlocking or disconnection of the feeding and receiving connector halves A and B is considerably more easily carried out as described below. When the lever 3 is further strongly grasped, the engagement between the projection 38b of the cam 38 and the concave portion 37b is released as understood from FIG. 8B. The locking bar 37 rises relatively with respect to the locking plate 34. As a result, the cam 38 instantly returns to its original state by means of the notch 37a of the locking bar 37 and the tension coil spring 40 to unlock the lever 3. At the same time, the connector main body 2 of the feeding connector half A retreats in the case 1 due to the strong resiliency of the compression coil spring 10 so as to be disconnected from the connector main body 42 of the receiving connector half B.

When the lever 3 is released during the engagement procedure of the feeding and receiving connector halves A and B as described above, the compression coil spring 10 causes the feeding and receiving connector halves A and B to move in the direction that the feeding and receiving connector halves A and B are apart from each other, which prevents an incomplete locking.

Figure 10:
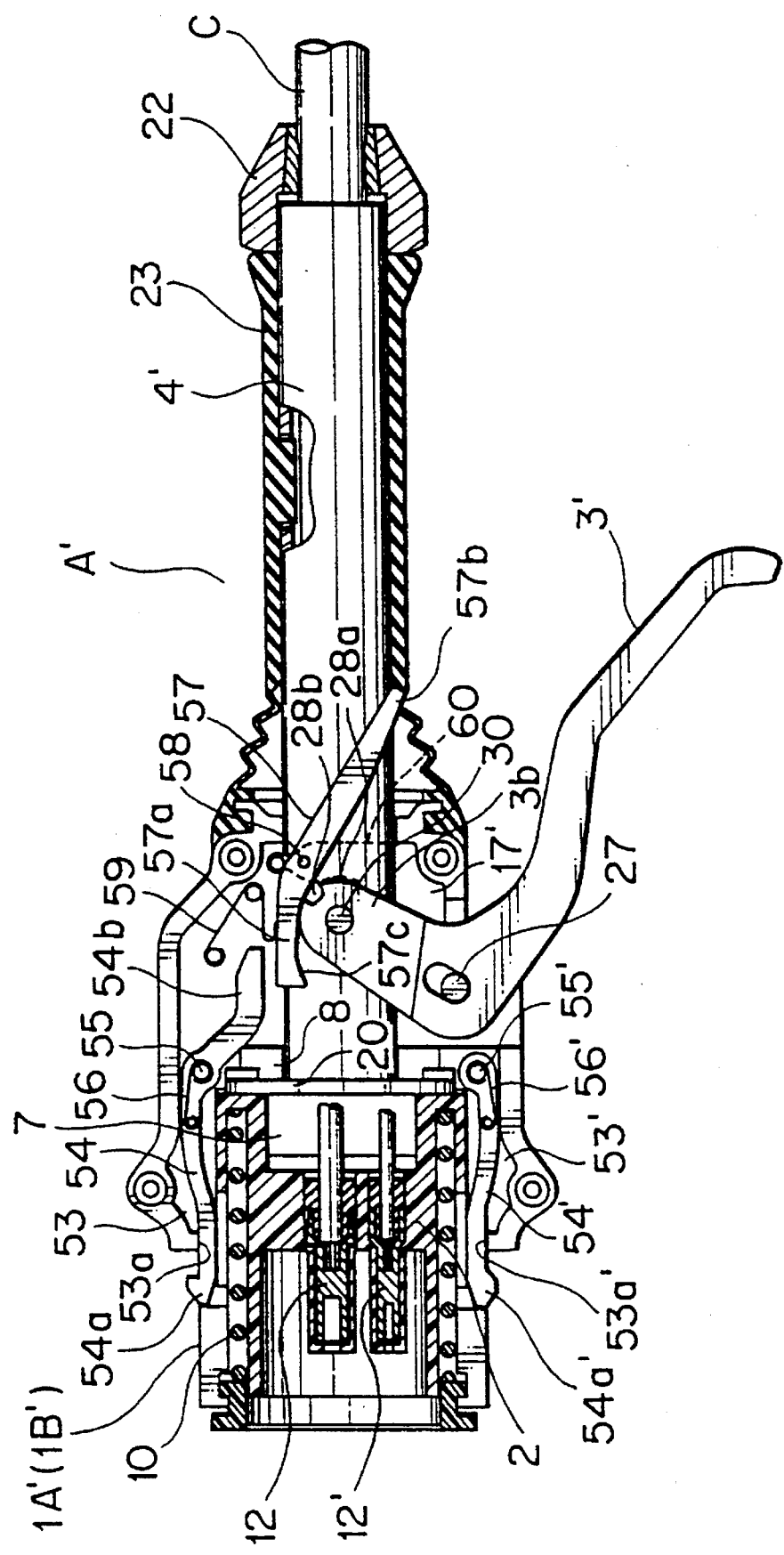
FIG. 10 is a cross-sectional view through the length of a feeding connector half A' according to a second embodiment of the present invention.
Figure 11:
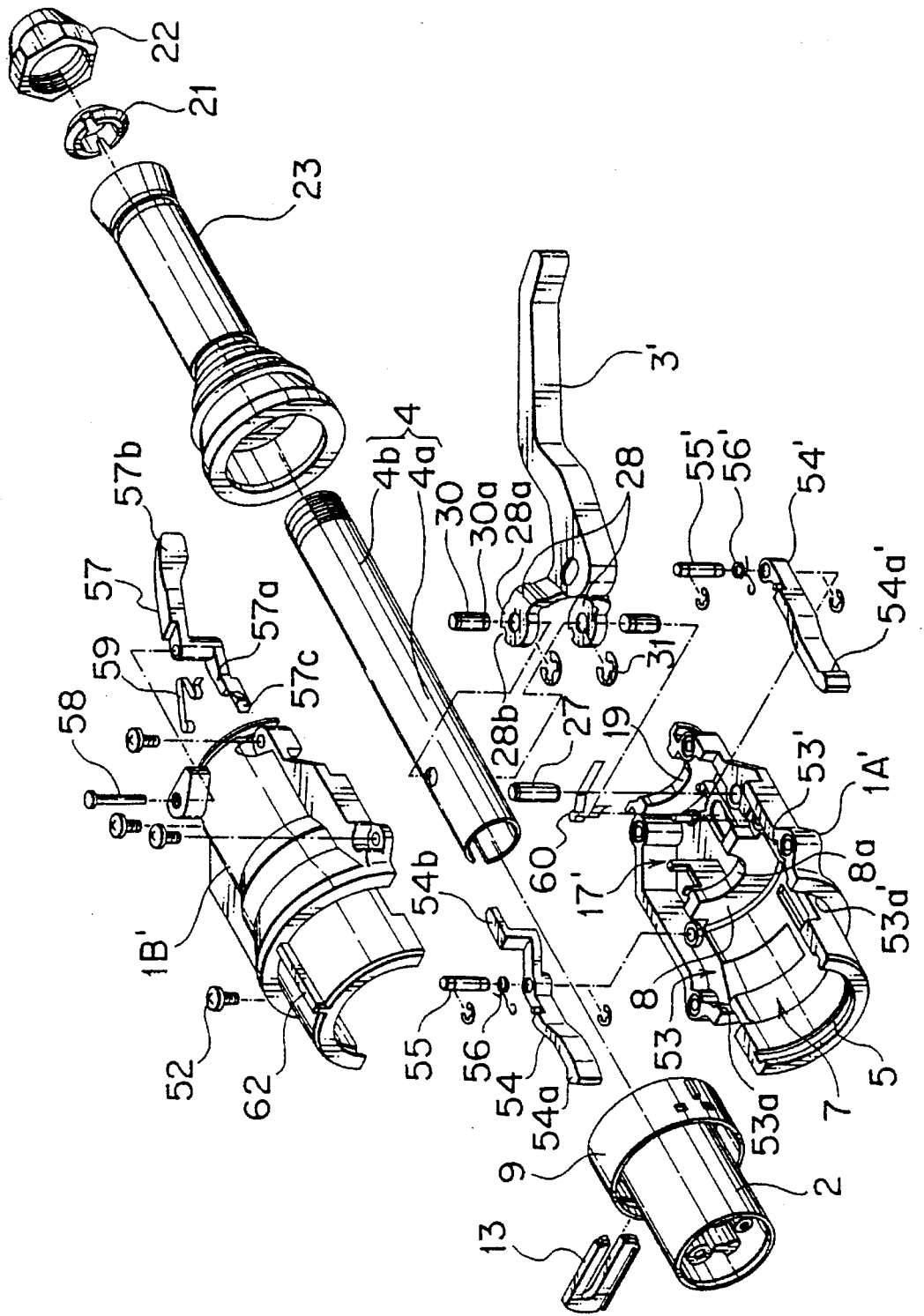
FIG. 11 is an exploded perspective view of a primary portion of the feeding connector half A' of FIG. 10.
Figure 12:
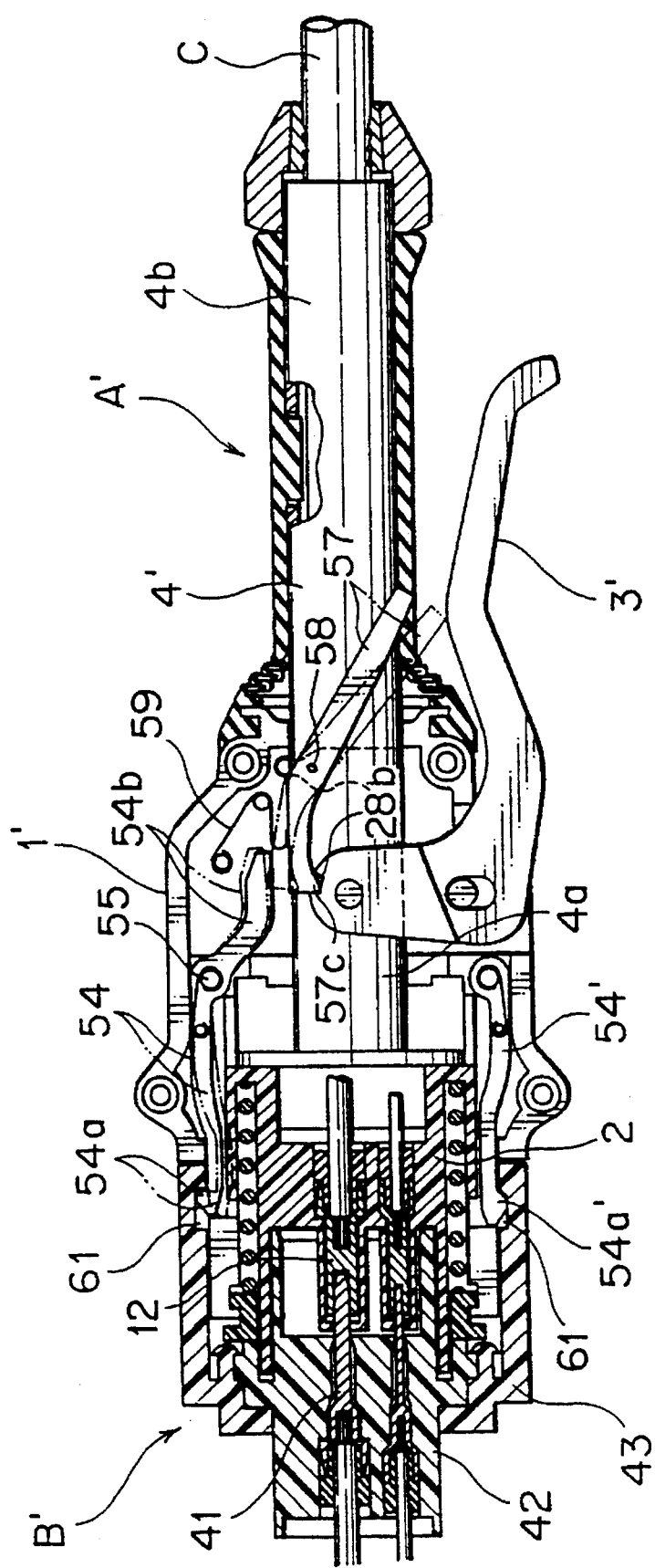
FIG. 12 is a cross-sectional view through the length of the feeding and receiving connector half A' and B' of FIG. 10 showing the connector halves' engagement.

FIG. 10 is a cross-sectional view of a feeding connector half A' according to a second embodiment of the present invention. FIG. 11 is an exploded perspective view of a primary portion of the feeding connector half A' shown in FIG. 10. FIG. 12 shows a cross-sectional view through the longitude of the feeding connector half A' in a locked state with the receiving connector half B'. In FIGS. 10, 11 and 12, the reference numerals as used in the first embodiment described above designate the same elements in the second embodiment of the present invention and therefore, an explanation thereof will be omitted with respect to the second embodiment of the present invention.

Referring to FIG. 12, case 1' comprises a pair of split cases 1A' and 1B' as shown in FIG. 11 and is provided with a partition wall 8 at an intermediate portion thereof to divide the case 1' into a connector main body accommodating portion 7 and a lever mounting portion 17'.

A connector main body 2 of the feeding connector half A' is slidably mounted on the connector main body accommodating portion 7. A handle 4', having a main body 4a and a slider 4b integral with each other to form a straight pipe, is slidably supported from a drilled hole 8a of the partition wall 8 and an opening 19 at a rear end portion of the case 1'. Supporting pieces 28, forming a forked portion of the lever 3', are supported by pins 27 at the lever mounting portion 17' and are rotatably attached to rite handle 4' in a manner similar to that of the first embodiment.

Locking chambers 53 and 53' are vertically arranged at the lever mounting portion 17' so as to outwardly expand. The locking chambers 53 and 53' are provided with openings 53a and 53a' on the side of the connecting main body accommodating portion 7.

Reference numerals 54 and 54' represent locking arms for the receiving connector half B'. One of the locking arms 54 is supported at a middle thereof by a pin 55 at the locking chamber 53. An end of the locking arm 54 extends from the opening 53a to an outer periphery of the case 1' and a tip thereof is provided with a hook-shaped locking claw 54a. Further, another end of the locking arm M extends on the lever mounting portion 17' side and is formed as a locking piece 54b for a releasing lever 57, described below. A tip of the other locking arm 54' extends from an opening 53a' toward an outer periphery of the case 1 like the locking arm 54, and a mountain-shaped semi-lock-type locking claw 54a' is formed at the tip of the locking arm 54'. A rear end of the locking arm 54' is supported by a pin 55' at the locking chamber 53'. Reference numerals 56 and 56' are wire springs for urging the locking arms 54 and 54' outwardly.

Reference numeral 57 represents a releasing lever of the above-described locking arm 54. A middle portion of the releasing lever 57 is supported by a pin 58 on the side of the split case 1B', and one of the operating portions 57a thereof is situated between the locking piece 54b of the locking arm 54 and one of the supporting pieces 28 of the lever Y. Another operating portion 57b outwardly projects on the rear side of the case 1'. A hook-shaped locking claw 57c downwardly projects from a tip of the operating portion 57a. Further, an end face of the supporting piece 28 is formed as a round portion 18a and is provided with a locking concave portion 18b for the locking claw 57c. Reference numeral 59 represents a plate spring for urging the operating portion 57a of the releasing lever 57 toward the lever 3'. That is, toward the round portion 28a of the supporting piece 18. Reference numeral 60 represents a spring for pushing the operating portion 3a of the lever 3'.

Guide projections 62, extending in the direction that the feeding and receiving connector halves A' and B' are engaged with each other, are formed on outer walls of the pair of split cases 1A' and 1B'. The guide projections also work as positioning members.

In the receiving connector half B', on an inner wall of the shell 43, is formed a locking channel 61 engaged with the locking arms 54 and 54' of the feeding connector half A', in place of the rolling pins 50 according to the preliminary locking means of the first embodiment of the present invention. The receiving connector half B' is further provided with a channel, not shown, which is engaged with projections 62 of the locking arms 54 and 54' of the feeding connector half A'.

In the second embodiment, the guide projection 62 is engaged with the channel, and the case 1' of the feeding connector half A' is inserted into the shell 43 of the receiving connector half B' to engage a hook-shaped claw 54a and a semi-lock-type locking claw 54a' of locking arms 54 and 54', respectively, which are engaged with the channels 61, permitting the connector halves A' and B' to be preliminarily locked to each other.

On grasping the lever 3' toward the handle 4' under the conditions described above, the slider 4a proceeds, similarly as in the first embodiment of the present invention, to push the connector main body 2 of the feeding connector half A' in the case 1' toward a main body 42 of the mating connector main body 42 of the receiving connector half B'. This causes the slider 4a to be positioned between the locking arms 54 and 54' which are vertically arranged to prevent the arms 54 and 54' from inwardly closing. As a result, the feeding connector half A' is more securely locked to the receiving connector half B'. Then, the connection between the female terminals 12 and 12' and the male terminals 41 and 41', as well as the engagement between the connector main bodies 2 and 42 and the feeding and receiving connector halves A' and B', are completed.

In the process of completely locking the feeding and receiving connector halves A' and B', the rotation of the lever 3' causes the round portion 28a of the supporting piece 28 to slidably contact a lower end of the working portion 57a of the releasing lever 57 urged by the plate spring 59, which permits the working portion 57a, of the releasing lever, to upwardly rotate about the pin 58. Then, the hook-shaped locking claw 57c, at a front end of the operating portion 57a, reaches and engages the locking concave portion 28b, which allows the lever 3' to be locked.

When the feeding and receiving connector halves A' and B' are being unlocked or disconnected from each other, the operating portion 57b of the releasing lever 57, is depressed first so as to be disconnected from the locking concave portion 28b of the lever 3', causing the connector main body 2 of the feeding connector half A' to be disconnected from the mated connector main body 42 of the receiving connector half B' by the compression coil spring 10 similarly to as in the first embodiment of the present invention.

After the connector main body 2 of the feeding connector half A' retreats or is withdrawn from its engagement with the connector main body 42 of the receiving connector half B', a space is generated between the locking arms M and 54'. Further depressing of the operating portion 57b of the releasing lever 57, then causes the working portion 57a to raise a locking piece 54b of the locking arm 54 with respect to a pin 55, allowing hook-shaped locking claw 54a, opposing the locking piece Mb, to move downwardly. As a result, the locking channel 61, on an inner wall of the shell 43, is disconnected from the hook-shaped locking claw 54a. Further, a locking claw 54a', of the other locking arm 54', which is engaged with the other channel 61, is a semi-lock-type and the engagement is easily overcome by drawing out the feeding connector half A'.

As described above, the processes of engaging, locking, unlocking and disconnecting the feeding and receiving connector halves A' and B' are performed pursuant to a series of steps: inserting the feeding connector half A' into the receiving connector half B'; preliminarily locking the feeding and receiving connector halves A' and B' to each other; grasping and rotating the lever 3' to completely lock the feeding connector half A' to the receiving connector half B'; depressing the releasing lever 57; making the connector main body 2 of the feeding connector half A' retreat or withdraw from engagement with the connector main body 42 of the receiving connector half B'; depressing the releasing lever 37 of the lever locking and unlocking means to overcome the complete lock; overcoming the preliminary lock; and, drawing out the receiving connector half B' from its engagement with the feeding connector half A'.

Even if the operator's hand is released from the releasing lever 57, while the lever 3' is being unlocked, the round portion 28a of the lever 3', which is rotatably attached to the slider 4a, is in contact with the working portion 57a of the releasing lever 57 so that the handle 4' retreats to lift the locking piece 54b of the locking arm 54, which permits the feeding and receiving connector halves A' and B' to be unlocked from each other.

In the second embodiment, it is unnecessary to slightly rotate the feeding connector half A' about the receiving connector half B' similarly as to in the first embodiment of the present invention, but it is sufficient to get the feeding and receiving connector halves A' and B' either abutting each other or separate from each other, resulting in easier locking and unlocking operations.

Figure 13:
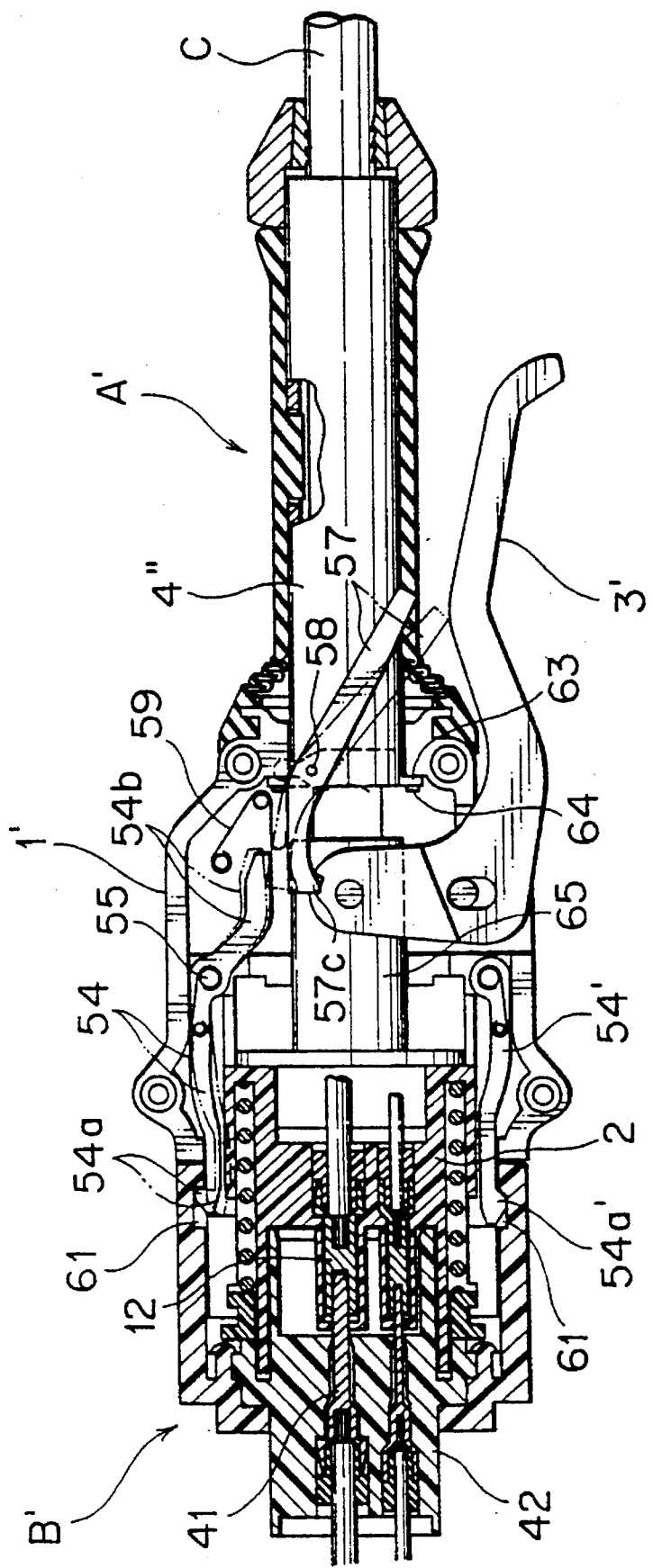
FIG. 13 is a cross-sectional view through the longitude of the feeding connector half A" according to a third embodiment of the present invention.
Figure 14:
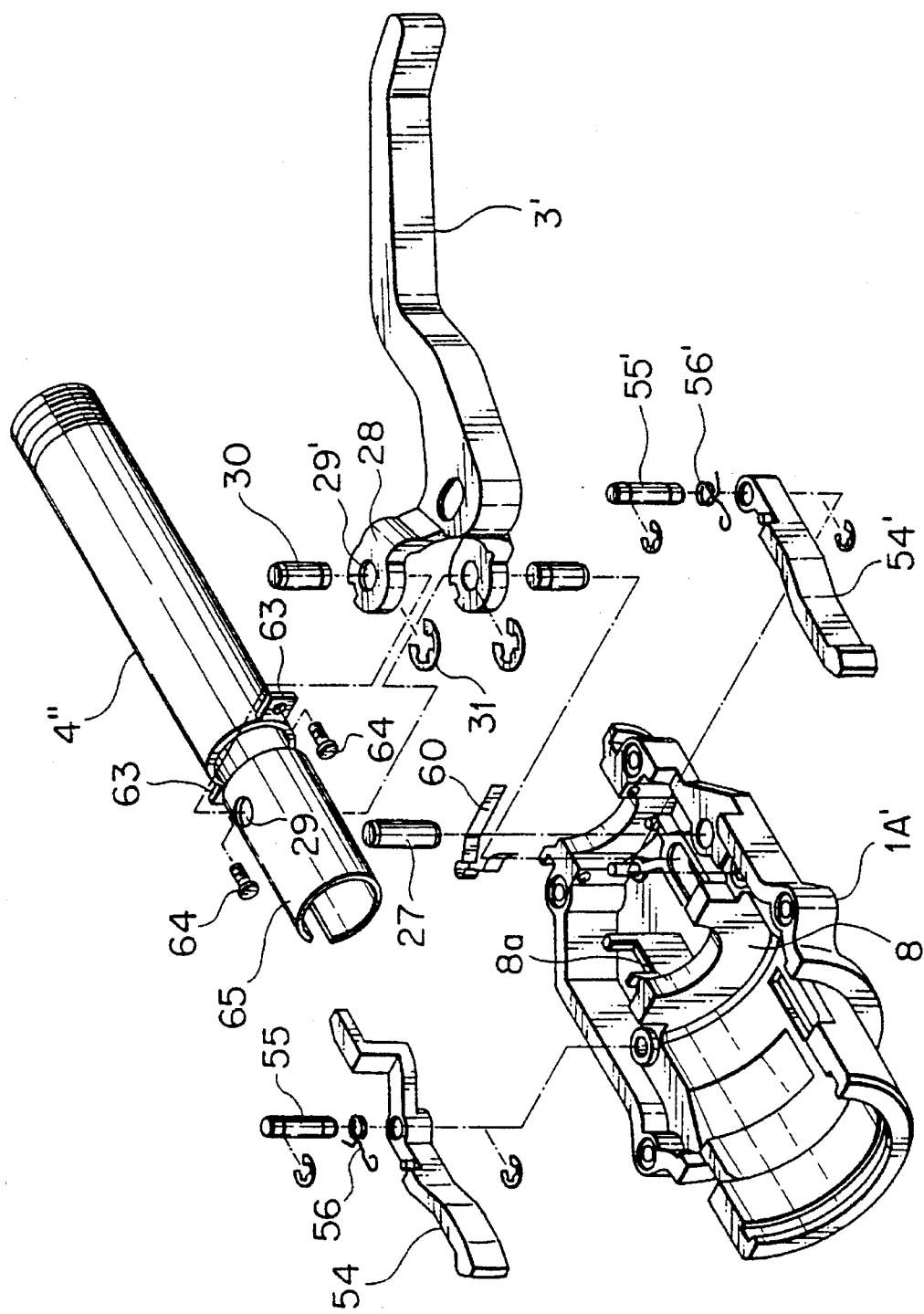
FIG. 14 is an exploded perspective view of a primary portion of the construction shown in FIG. 13.
Figure 15:
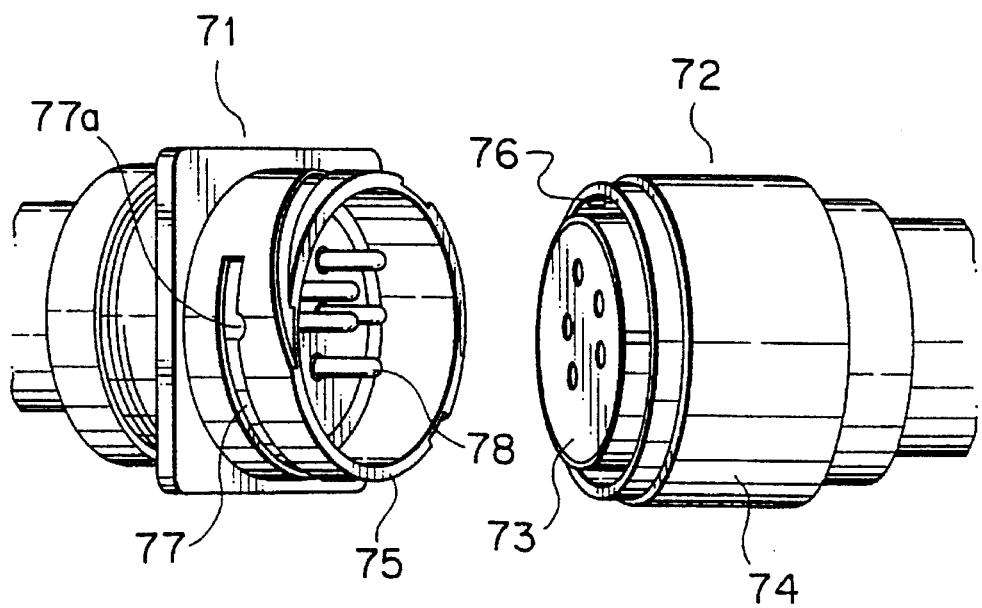
FIG. 15 is a perspective view of a conventional electrical connector in a disconnected state.
Figure 16:
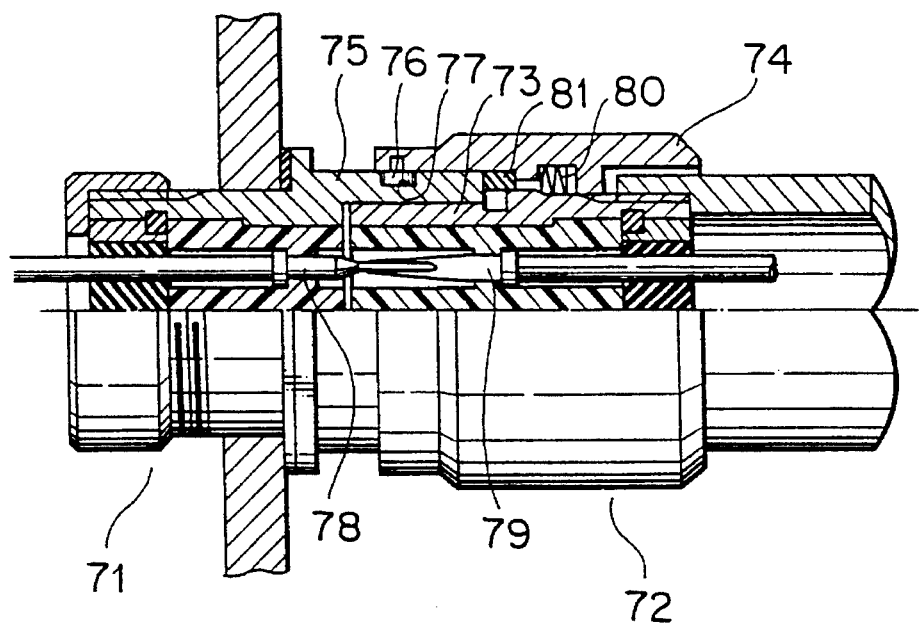
FIG. 16 is a cross-sectional view through the length of the electrical connector illustrated in FIG. 15 in a connected state.

FIG. 13 is a cross-sectional view through the length of the feeding connector half A' according to a third embodiment of the present invention. FIG. 14 is an exploded perspective view of a primary portion of the feeding connector half A' shown in FIG. 13. In this embodiment, the slider 4a for pushing the connector main body illustrated in FIGS. 11 and 12, is formed to be separate from a main body 4b' of the handle 4".

More particularly, reference numeral 4" represents a pipe-shaped fixed handle, and reference numeral 65 represents a slider. The fixed handle 4" is provided with mounting plates 63 at both ends thereof and is fixed to a rear wall 1a with the opening 19 of the split case 1A' and 1B' by means of a screw 64. A flange engaging the rear wall 1a may be formed in place of the mounting plate 63. The slider 65 has the shape of a pipe with the same diameter as the fixed handle 4" and a tip thereof is inserted into and supported by a drilled hole 8a of a partition wall 8. A lever 3' is attached to a rear portion of the slider 65.

The construction of the slider 65, lever 3', releasing lever 57 and similar, are similar to as in the second embodiment of the present invention and therefore, an explanation thereof will be omitted.

In the first and second embodiment of the present invention, the rotation of the lever 3 or 3' causes the handle 4, the slider 4a and the main body 4b to slide simultaneously. However, in these embodiments, there is a fear that the connector main body 2 does not slide smoothly because the cable C is drawn into the main body 4b, as described above.

In the third embodiment of the present invention, the rotation of the lever 3' permits the slider 65 to slide regardless of the handle 4", which provides smoother engagement between the connector main body 2 of the feeding connector half A' and the mating connector main body 42 of the receiving connector half B'.

It is possible to apply the separate construction of the slider 65 and the fixed handle 4" in the third embodiment of the present invention to the 1ever 3 and the handle 4 in the same manner as in the first embodiment of the present invention. The slider 65 may be integrally formed with the connector pushing plate 20 or the connector main body 2 which are illustrated in FIGS. 1 and 10. As described above, with the construction according to the present invention, not only the incomplete connection between the feeding and receiving connector halves A' and B' is prevented, but also the locking or unlocking of the feeding and receiving connector halves A' and B' is carried out with a one-touch operation.

What is claimed is:

1. An electrical connector comprising a feeding connector half and a receiving connector half, wherein said feeding connector half comprises:

a case having a front half portion and a rear half portion;

a connector main body slidably mounted within said front half portion of said case, said connector main body having terminal accommodating cavities for housing a plurality of terminals;

a handle including a main body portion and a slider, wherein said slider is slidably mounted in a drilled hole in a partition wall within said case for causing said connector main body to slide;

a rotatable lever having a working portion, an intermediate portion and an operating portion, said intermediate portion being between said working portion and said operating portion, said working portion being rotatably attached to one end of said handle within said case and said operating portion projecting out of said case;

a preliminary locking means comprising a pair of locking arms rotatably attached in said case, said locking arms each having a hook-shaped locking claw at a front end of said locking arms, said hook-shaped locking claws outwardly projecting so as to engage locking channels of said receiving connector half and wire springs adjacent to each of said locking arms for urging said hook-shaped locking claws outwardly into engagement with said locking channels of said receiving connector half; and a secondary locking means attached to said handle and adjacent to said rotatable lever for locking and unlocking said rotatable lever wherein said rotatable lever is locked after said feeding connector half and said receiving connector half are preliminarily locked to each other and then said rotatable lever is rotated to a position where said operating portion of said rotatable lever is rotated towards and near said handle so that said feeding connector half is completely locked to said receiving connector half.

2. An electrical connector comprising a feeding connector half and a receiving connector half, wherein said feeding connector half comprises:

a case having a front half potion and a rear half portion;

a connector main body slidably mounted within said front half portion of said case, said connector main body having terminal accommodating cavities for housing a plurality of terminals;

a compression coil spring surrounding said connector main body for urging said connector main body of said feeding connector half toward said receiving connector half;

a handle including a main body portion and a slider, wherein said slider is slidably mounted in a drilled hole in a partition wall within said case for causing said connector main body to slide;

a rotatable lever having a working portion, an intermediate portion and an operating portion, said intermediate portion being between said working portion and said operating portion, said working portion being rotatably attached to one end of said handle within said case and said operating portion projecting out of said case;

said slider having radially extending shaft holes in a circumferential wall thereof and said working portion of said rotatable lever including a pair of supporting pieces forming a forked portion at a tip thereof such that said slider is placed between said pair of supporting pieces, said pair of supporting pieces having shaft holes corresponding to said shaft holes on said circumferential wall of said slider so that pins with narrow channels at front ends of said pins are inserted into said shaft holes of said supporting pieces when said slider is put between said pair of supporting pieces and stop rings are mounted through said supporting pieces and an outer periphery of said slider to said narrow channels;

a preliminary locking means comprising a pair of locking arms rotatably attached in said case, said locking arms each having a hook-shaped locking claw at a front end of said locking arms, said hook-shaped locking claws outwardly projecting so as to engage locking channels of said receiving connector half and wire springs adjacent to each of said locking arms for urging said hook-shaped locking claws outwardly into engagement with said locking channels of said receiving connector half; and a secondary locking means attached to said handle and adjacent to said rotatable lever for locking and unlocking said rotatable lever wherein said rotatable lever is locked after said feeding connector half and said receiving connector half are preliminarily locked to each other and then said rotatable lever is rotated to a position where said operating portion of said rotatable lever is rotated towards and near said handle so that said feeding connector half is completely locked to said receiving connector half.

3. An electrical connector comprising a feeding connector half and a receiving connector half, wherein said feeding connector half comprises:

a case having a front half portion and a rear half portion;

a connector main body slidably mounted within said front half portion of said case, said connector main body having terminal accommodating cavities for housing a plurality of terminals;

a handle including a main body portion and a slider, wherein said slider is slidably mounted in a drilled hole in a partition wall within said case for causing said connector main body to slide;

a rotatable lever having a working portion, an intermediate portion and an operating portion, said intermediate portion being between said working portion and said operating portion, said working portion being rotatably attached to one end of said handle within said case and said operating portion projecting out of said case;

said slider having radially extending shaft holes in a circumferential wall thereof and said working portion of said rotatable lever including a pair of supporting pieces forming a forked portion at a tip thereof such that said slider is placed between said pair of supporting pieces, said pair of supporting pieces having shaft holes corresponding to said shaft holes on said circumferential wall of said slider so that pins with narrow channels at front ends of said pins are inserted into said shaft holes of said supporting pieces when said slider is put between said pair of supporting pieces and stop rings are mounted through said supporting pieces and an outer periphery of said slider to said narrow channels;

a preliminary locking means comprising a pair of locking arms rotatably attached in said case, said locking arms each having a hook-shaped locking claw at a front end of said locking arms, said hook-shaped locking claws outwardly projecting so as to engage locking channels of said receiving connector half and wire springs adjacent to each of said locking arms for urging said hook-shaped locking claws outwardly into engagement with said locking channels of said receiving connector half;

a secondary locking means attached to said handle and adjacent to said rotatable lever for locking and unlocking said rotatable lever wherein said rotatable lever is locked after said feeding connector half and said receiving connector half are preliminarily locked to each other and then said rotatable lever is rotated to a position where said operating portion of said rotatable lever is rotated towards and near said handle so that said feeding connector half is completely locked to said receiving connector half; and said secondary locking means for locking and unlocking said rotatable lever comprising:

a locking concave portion on an outer periphery of said working portion of said rotatable lever;

a releasing lever rotatably attached within said case, said releasing lever having an operating portion at a front end portion thereof and said operating portion of said releasing lever having a locking claw at a front end thereof; and a plate spring means for urging said front end portion of said releasing lever towards said rotatable lever, wherein said rotatable lever is locked when said locking concave portion in said working portion of said rotatable lever engages said locking claw of said operating portion of said releasing lever and wherein said rotatable lever is unlocked when said locking concave portion in said working portion of said rotatable lever is disengaged from said locking claw of said operating portion of said releasing lever.

* * * * *